June 16, 1931.    H. L. YOUNG    1,810,585
TUBE MAKING METHOD AND APPARATUS
Filed July 27, 1928    2 Sheets-Sheet 1

Inventor
Harvey L. Young
By Eakin & Avery Attys.

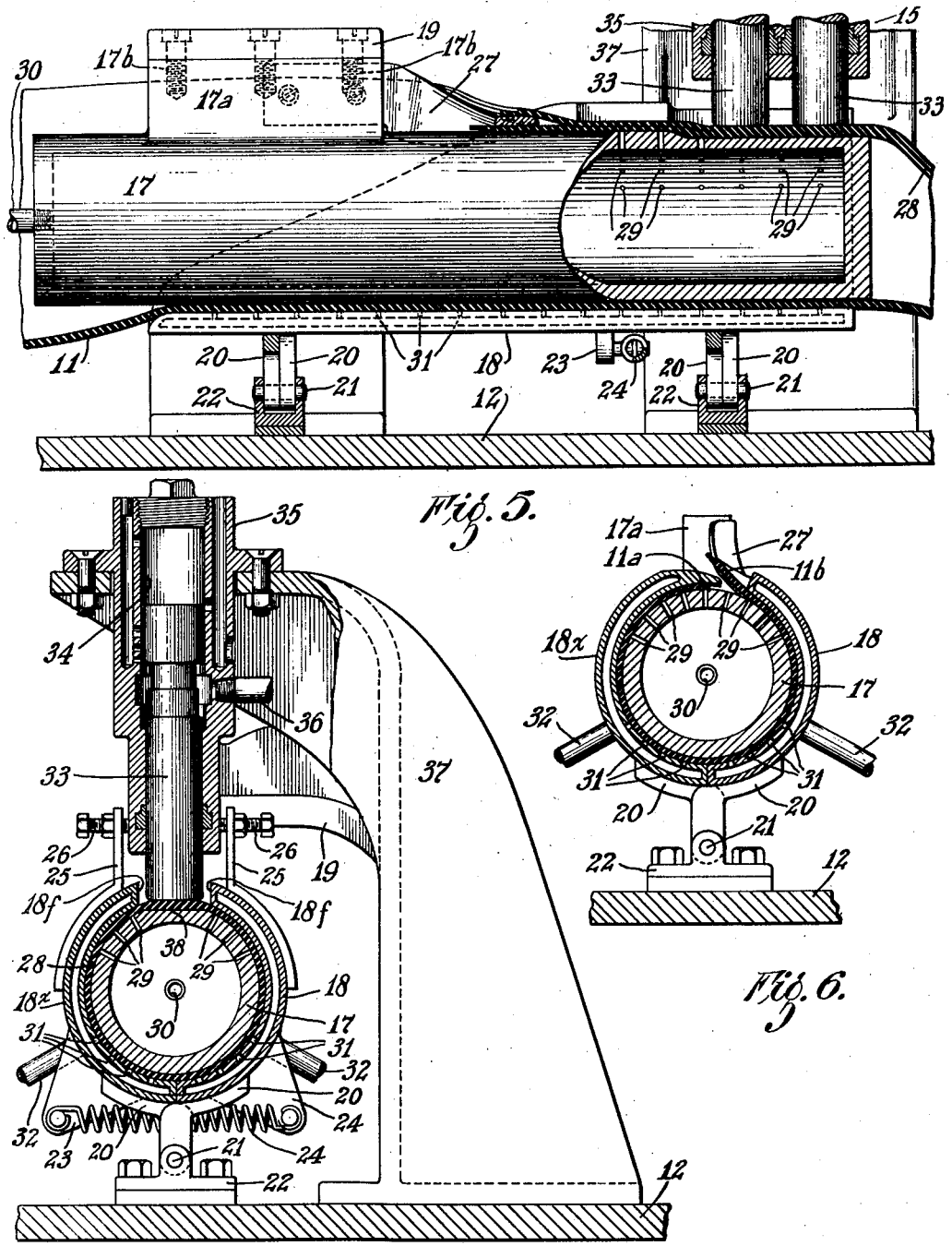

Patented June 16, 1931

1,810,585

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

TUBE-MAKING METHOD AND APPARATUS

Application filed July 27, 1928. Serial No. 295,694.

This invention relates to the art of making rubber tubes by longitudinally feeding a continuous strip of sheeted rubber stock and progressively folding the margins of the strip into contact with each other and joining them in a seam to give the strip tubular form.

The chief object of the invention is to provide an improved method and improved apparatus for folding the marginal portions of a flat strip of material into overlapped relation and joining them in a smooth, strong and impervious longitudinal seam. Another object is to reduce the friction of the strip in contact with the tube-forming apparatus. Another object is to provide for forming the tube progressively from a continuous strip of rubber drawn, in a soft and tacky condition, directly from a calender, and thus to avoid the expense of liners, storage, and trucking. A further object is to produce tubes which are uniformly of correct diameter.

Of the accompanying drawings:

Fig. 5 is a vertical section of the apparatus shown in Fig. 4, a part being broken away and in section.

Fig. 6 is a section on line 6—6 of Fig. 4.

Fig. 7 is a section on line 7—7 of Fig. 4.

Figure 1:
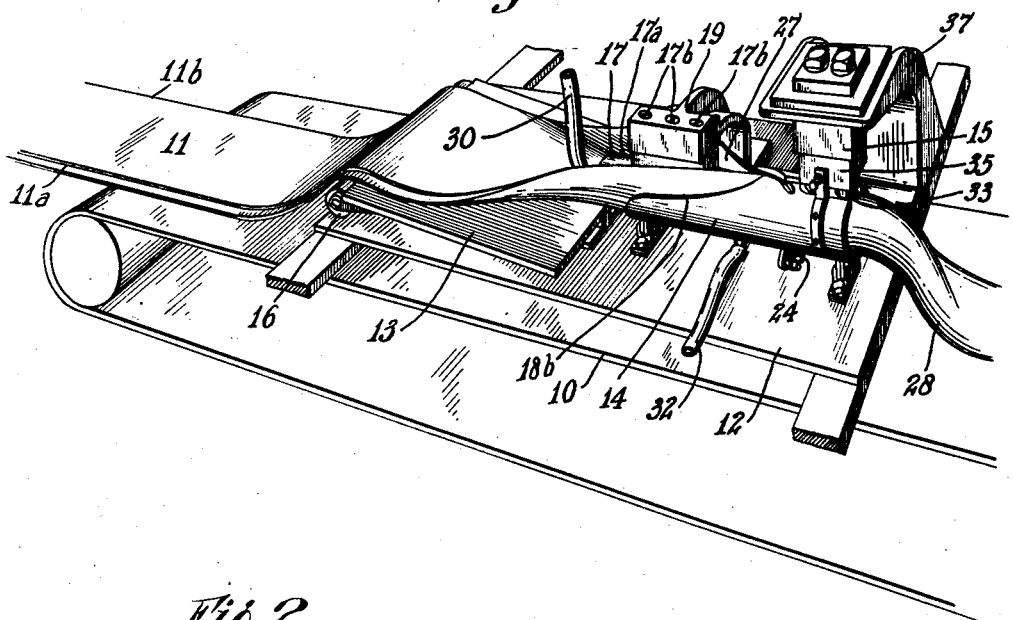
Fig. 1 is a perspective view of apparatus embodying and adapted to carry out my invention in its preferred form.

Referring to Fig. 1 of the drawings, 10 is an endless conveyor belt upon which a strip of unvulcanized rubber composition 11 is delivered to and conveyed from my improved tube-forming apparatus. Preferably the strip 11 is drawn continuously through my folding and seaming apparatus from the calender on which it is formed. The strip 11 preferably has stepped marginal portions $11^a$, $11^b$ of diminishing thickness toward their edges as shown, and this construction may be obtained by sheeting two strips of stock and assembling them, as they pass from the calender, in face-to-face contact with each other with their margins offset, in a manner heretofore known.

Spanning the conveyor belt 10 just above the upper reach thereof is a table 12 upon which are mounted an inclined strip-guide 13, a strip-folding device 14, and a seam-coalescing device 15. A strip-guiding and supporting roller 16 is journaled at the work-receiving end of the inclined strip-guide 13, and the latter is adapted to receive the strip 11 as it is drawn upward off the conveyor 10, and to direct it in a descending path toward the receiving end of the strip-folding device 14.

The strip-folding device is adapted to fold the marginal portions of the strip 11 onto each other and join them in a longitudinal seam. It comprises a hollow cylindrical axial form or mandrel 17 and a pair of concentric, transversely-arcuate, hollow sleeve-members 18, $18^x$ extending about said axial form at the respective sides thereof and radially therefrom so as to define therewith spaced therefrom so as to define therewith a stock-receiving space. The mandrel 17 is supported in horizontal position from above, being formed with a boss $17^a$ which is secured by screws $17^b$, $17^b$ to an overhanging bracket-arm 19 mounted upon the table 12.

Each sleeve-member 18, $18^x$ is provided at its lower margin adjacent its ends with respective hinge-members 20, 20 and the hinge members of both sleeves are pivoted in axial alignment at 21, 21 upon respective brackets 22, 22 mounted upon the table 12. Each sleeve member is provided with a downwardly-extending arm 23 and said arms are connected to each other by a tension spring 24 lying beneath the sleeves and normally above the axis of the pivots 21, the arrangement being such that the sleeves are yieldingly held normally in closed or operative position, but may be held in opened position, with the spring 24 in over-center position with relation to the axes 21, upon occasion, as when the leading end of the strip 11 is initially threaded through the folder. Arms 25, 25 extending upward from the respective sleeve-members 18, 18ˣ have their respective end-portions provided with set-screws 26, 26 which bear against opposite sides of the seam-coalescing device 15 when the sleeve members are in operative position, to position said sleeve-members and to provide adjustment to compensate for slight variation in the thickness of the strip 11.

Figure 4:
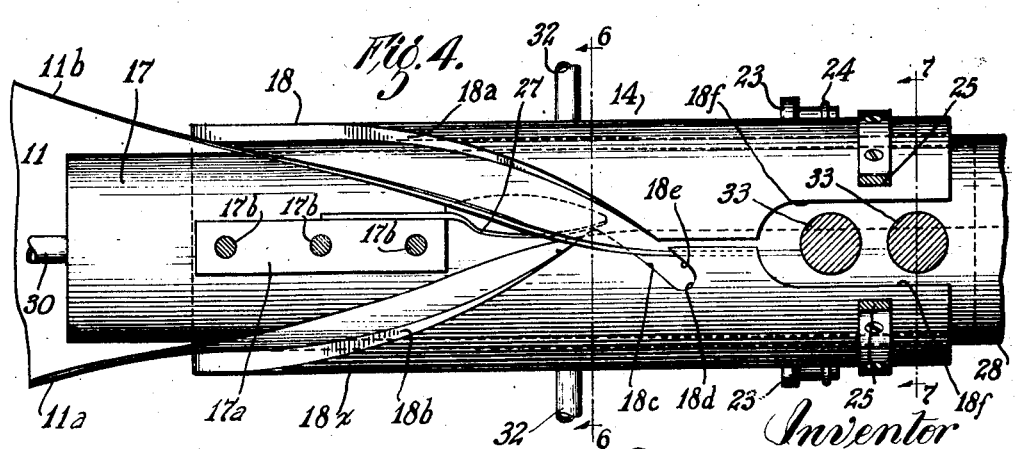
Fig. 4 is a plan view of a portion of the apparatus shown in Fig. 1, parts being broken away and in section.

The folding of the strip 11 and the overlapping of its marginal portions in the folding device 14 is effected with desirable accuracy by reason of the shape of the upper margins of the sleeve members 18, 18ˣ which define a strip-guiding bight, the design of which is best shown in Figs. 1 and 4. The upper margins 18ª, 18ᵇ of the sleeve-members 18, 18ˣ recede from the work-receiving end of the device in helicoidal curves and the margin 18ᵇ is of lesser pitch than the margin 18ª where they approach each other at the upper, middle zone of the device, and from an approximately medial position in said zone the margin 18ᵇ, Fig. 4, continues in a reach 18ᶜ transverse to its helicoidal reach and uniformly spaced from the margin 18ª and then in a semi-circular reach 18ᵈ and a return reach 18ᵉ, the latter lying in extension of the margin 18ª, so that the reaches 18ᶜ, 18ᵈ, 18ᵉ of the margin 18ᵇ and the adjacent part of the margin 18ª define in effect a closed-end slot which accommodates and whose walls suitably guide the margins 11ª, 11ᵇ of the laminated strip 11.

Figure 2:
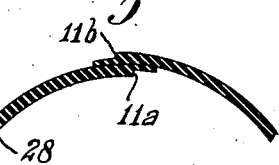
Fig. 2 is a fragmentary transverse section of the work through the longitudinal seam thereof as the latter is initially formed.
Figure 3:
Fig. 3 is a view similar to Fig. 2 at a subsequent period of operation showing the seam in its final coalesced or healed condition.

A plow 27 is mounted upon the boss 17ª of the mandrel 17 and extends toward the point where the converging margins 18ª, 18ᵇ, of the sleeves 18, 18ˣ, approach nearest each other, the plow 27 being adapted to hold the overlying margin 11ᵇ of the strip 11 out of contact with the underlying margin 11ª thereof until both margins are properly positioned one above the other. The overlapped marginal portions of the laminated strip 11 are shown in Fig. 2 and the tubular structure thus formed is designated 28.

To avoid excessive friction between the mandrel 17 and the strip 11 as the latter is drawn through the folding device, the mandrel 17 is formed with a plurality of apertures 29, 29 extending through its top wall adjacent the delivery end thereof and the hollow interior of the mandrel is connected with a source of pressure fluid through a supply-pipe 30 mounted in the end wall of the mandrel at the receiving end thereof. Also for air-lubrication the sleeve-members 18, 18ˣ have their inner walls formed with apertures 31, 31 in their lowermost portions and the hollow interiors of said members are connected with a source of pressure fluid through respective supply-pipes 32, 32.

For compacting and coalescing the overlapped marginal portions 11ª, 11ᵇ of the strip comprising the seam of the tube 28, I provide the seam-hammering device 15 which comprises two hammers 33, 33 which are positioned in longitudinal alignment over the middle zone of the mandrel over which the tube seam is drawn, and the sleeve-members 18, 18ˣ are cut away at 18ᶠ, 18ᶠ to expose the seam to the hammers at their delivery ends. The hammers 33 preferably are of the pneumatic type, as shown, being mounted in respective double-acting fluid-pressure cylinders, such as the cylinder 34, Fig. 7, of a cylinder-block 35, and actuated by fluid-pressure from pressure lines such as that shown at 36. The arrangement of inlet and exhaust ports for the cylinders 34 is well known and will be understood from the drawing without further description. The cylinder-block 35 is supported from an overhanging bracket 37 mounted upon the table 12.

The hammers 33 preferably are adapted for such rapid reciprocation as to provide for an overlapping of the areas of the seam which are compacted by successive blows and as to permit substantially uninterrupted movement of the tube through the folding and hammering device at a speed equal to the speed at which the strip 11 is delivered from the calender.

In the operation of the apparatus, the two-ply strip 11 is continuously delivered, preferably from a calender, onto the conveyor 10 and then is withdrawn therefrom as the latter passes under the table 12, the strip passing upward over the guide-roller 16 and downwardly over the strip-guide 13, and then passing to the folding device 14 where its lateral marginal portions are folded onto each other. The downward inclination of the strip as it approaches the folding device provides for folding the flat strip to tubular form without excessive stretching of the marginal portions of the strip, the strip assuming tubular form by progressive descent of its middle zone with the latter supported by the guide 13 and the margins taking approximately the shortest course from the roll 16 to their positions within the folder, distorting hammock-like support of the fresh, soft stock being largely avoided by the continuing local support of the guide 13.

The strip is folded accurately to size by reason of the close engagement of the mandrel 17 and folding sleeves 18, 18ˣ with both broad surfaces of the strip, and friction between the strip and folding mechanism is substantially reduced by reason of the air currents, at low pressure, issuing from the mandrel and folding sleeves and which provide an air-lubrication. After passing beneath the compacting device 15, where the tube-seam is compacted and coalesced, the tube 28 passes onto the conveyor 12, and thereafter may be cut into lengths suitable for the making of inner tubes for pneumatic tires, or otherwise treated.

Friction of the work with the folding device is so reduced by the air currents therein that the friction between the tube 28 and the conveyor 10 is sufficient to draw the work through the aforesaid devices.

The invention provides a rapid and continuous method of making longitudinally-seamed laminated rubber tubing of superior quality and accurate size. The use of close-fitting forming mechanism on both surfaces of the strip material insures accurate dimensions in the tube, and the avoidance of friction in said mechanism obviates stretching of the stock with consequent thinning of the tube-walls.

The tube is made from warm, freshly-calendered stock so that no treatment such as applying a solvent or an adhesive to the margins of the strip is necessary to obtain a strong bond between the margins when they are lapped together, and the bond is further strengthened in being coalesced by the impact of the hammer blows whereby a smooth and attractive seam is produced.

My invention may be variously modified and I do not limit my claims wholly to the specific construction shown or the exact procedure described.

I claim:

1. The method of making a rubber tube which comprises progressively folding a strip of unvulcanized rubber to tubular form by drawing it through a folder and lubricating with a gaseous fluid applied to the outer face of the strip the passage of the strip through the folder.

2. The method of making a rubber tube which comprises progressively folding a strip of unvulcanized rubber into tubular form by guiding contact with both faces of the strip and lubricating with a gaseous fluid the guiding contact of both of the said faces.

3. The method of making a rubber tube which comprises wrapping a strip of material about a form and folding the marginal portions of the strip into overlapped relation thereupon by progression lengthwise of the strip and compacting the seam thus formed by pressing it against said form.

4. A method as defined in claim 3 in which the seam is pressed against the form by hammering.

5. Tube-making apparatus comprising means for folding a strip of material into tubular form and means for directing pressure fluid between the strip and said folding means.

6. Tube-making apparatus comprising means for folding a strip of material to tubular form by guiding contact with both of its faces and means for lubricating with a gaseous fluid the guiding contact of both of the said faces.

7. Tube-making apparatus comprising a stationary mandrel, means for drawing a strip of material past said mandrel, and means for folding said strip around said mandrel and joining its margins in a lapped seam by progression as it is so drawn, said means including a tubular forming structure having strip-guiding margins defining a bight for lapping one of the margins of the strip upon the other.

8. Tube-making apparatus comprising an apertured, stationary mandrel, means for drawing a strip of material past said mandrel, an arcuate, apertured folding member for folding the strip about the mandrel as it is so drawn, and means for forcing pressure fluid through the apertures of the mandrel and folding member to lubricate the passage of the strip.

9. Tube-making apparatus comprising a rigidly-mounted, stationary mandrel, means for drawing a strip of material past said mandrel, means for folding the strip about the mandrel and joining its margins in a seam by progression as it is so drawn, and means cooperatively associated with said mandrel for compacting said seam.

10. Tube-making apparatus as defined in claim 9 in which the seam-compacting means is a hammer acting against the mandrel as an anvil.

11. Tube-making apparatus comprising a rigidly-mounted, stationary, cylindrical mandrel having a flattened portion, means for drawing a strip of material past said mandrel, folder members for folding the strip about the mandrel and joining its margins in a seam by progression as it is so drawn, and a hammer adapted to deliver repeated blows upon said seam with the flat portion of the mandrel serving as an anvil.

12. Tube-making apparatus as defined in claim 11 in which portions of the mandrel and folder members are apertured, and including means for forcing a fluid through said apertures against the strip.

13. Tube-making apparatus comprising a stationary, cylindrical mandrel, means for drawing a strip of material past said mandrel, and a tubular folder formed with strip-guiding margins defining a bight and extending concentrically about said mandrel and adapted to fold the strip and join its margins in a longitudinal lapped seam as it is so drawn.

14. Tube-making apparatus comprising a stationary mandrel, means for drawing a strip of material past said mandrel, and a tubular folder associated with said mandrel and formed with a helicoidal folding edge.

15. Tube-making apparatus as defined in claim 14 in which the folder comprises two cooperating parts each of which has a helicoidal folding edge, said folding edges being of opposite pitch, for folding the strip of material about the mandrel progressively in both transverse directions from its middle portion.

16. Tube-making apparatus comprising a stationary mandrel, means for drawing a strip of stock past said mandrel, means for folding said strip around said mandrel and joining its margins in a seam by progression as it is so drawn, and means for holding said margins out of contact with each other until they are properly positioned one over the other.

17. Tube-making apparatus comprising a stationary mandrel, means for drawing a strip of stock past said mandrel, a pair of folder members formed with respective helicoidal edges of opposite pitch for folding the strip about the mandrel and directing its marginal portions progressively in helical paths to a position where they overlie each other, and a plow member so positioned with relation to the helicoidal folder-edges as to hold said marginal portions of the strip out of contact with each other until they are properly positioned with relation to each other.

In witness whereof I have hereunto set my hand this 23rd day of July, 1928.

HARVEY L. YOUNG.